United States Patent [19]
Shea

[11] Patent Number: 5,634,847
[45] Date of Patent: Jun. 3, 1997

[54] FIRE RETARDANT REINFORCED PLASTIC DUCT SYSTEM

[75] Inventor: Lawrence E. Shea, Reno, Nev.

[73] Assignee: Shea Technology, Reno, Nev.

[21] Appl. No.: 610,930

[22] Filed: Mar. 5, 1996

[51] Int. Cl.$^6$ .................................................. F24F 11/02
[52] U.S. Cl. .............................. 454/342; 137/74; 454/49
[58] Field of Search ............................ 454/49, 56, 61, 454/342, 357; 169/45, 48, 56, 65, 19, 91; 137/72, 74, 75; 52/232; 428/921

[56] References Cited

U.S. PATENT DOCUMENTS

| | | |
|---|---|---|
| 4,143,671 | 3/1979 | Olson .................................. 137/72 |
| 4,538,389 | 9/1985 | Heinen ............................... 137/75 X |
| 5,449,320 | 9/1995 | Shea ................................... 454/49 |

*Primary Examiner*—Harold Joyce
*Attorney, Agent, or Firm*—William F. Hamrock

[57] ABSTRACT

Fiberglass reinforced plastic fume exhaust systems include duct walls having apertures therein covered with meltable thermoplastic resins mounted thereon which melt and open up the apertures when exposed to high temperatures thereby admitting ambient air therein to reduce the temperature downstream of the systems and reduce the suction pressure at source of the high temperatures.

17 Claims, 5 Drawing Sheets

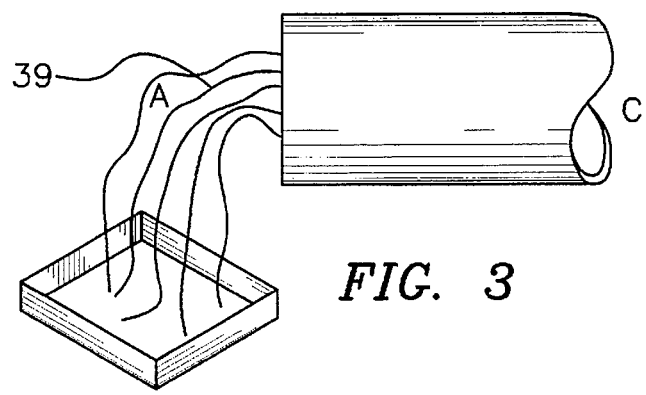
FIG. 3
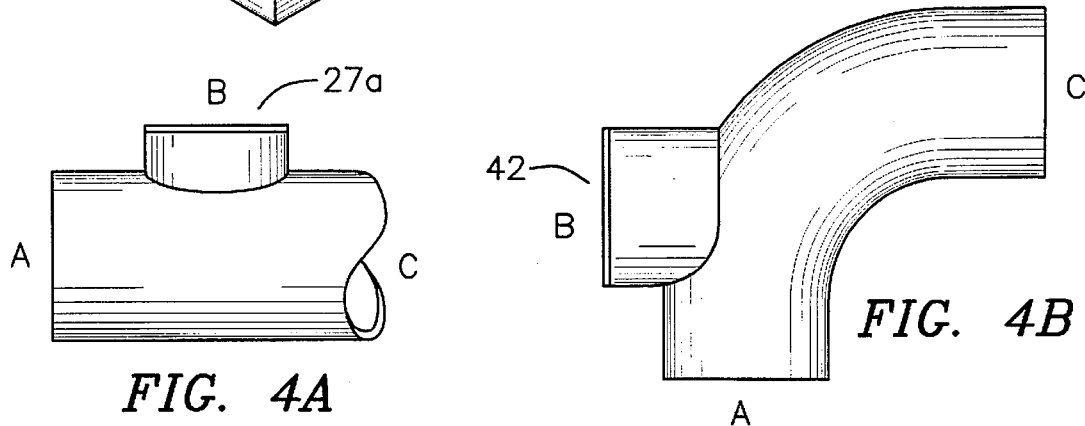
FIG. 4A
FIG. 4B
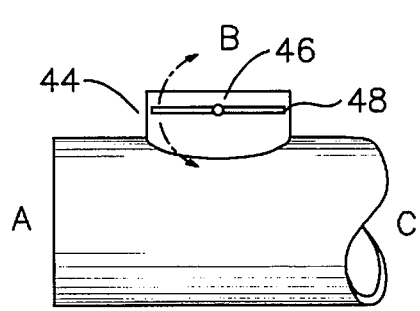
FIG. 5
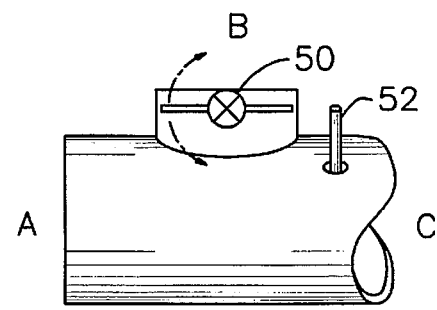
FIG. 6
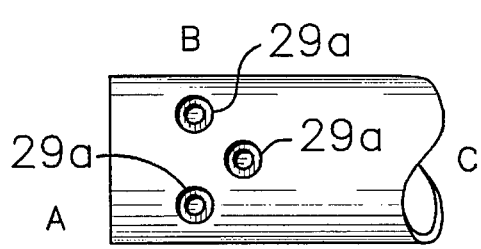
FIG. 7
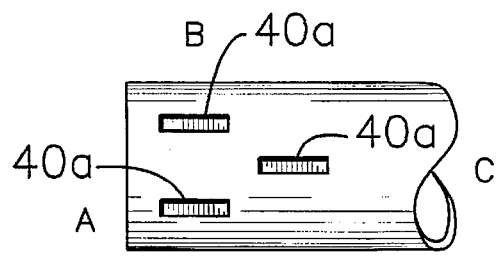
FIG. 8

FIRE RETARDANT REINFORCED PLASTIC DUCT SYSTEM

BACKGROUND OF THE INVENTION

Field of the Invention

This invention relates to providing protected fiberglass reinforced plastic fume exhaust ducts, and more particularly, to the use of duct temperature reduction devices (TRDs) in ductwork to defeat the progression of fire within it.

Description of Prior Art

Ductwork for corrosive vapor and fume exhaust systems is used in a large number of industries such as semiconductor manufacturing, pharmaceuticals, plating shops, paper and pulp mills, waste water treatment plants, plating shops, and many types of chemical processing plants. The corrosive vapors and fumes must be removed from the premises through exhaust ducts for the protection of the workers, and to prevent the deterioration of equipment and the structure.

Among the common materials used for ducts to exhaust the corrosive vapors and fumes have been stainless steel, coated metals, polyvinylchloride, polypropylene, and fiberglass reinforced plastics. There is concern among building officials, insurance companies, fire marshals and fire officials in general as to what happens with plastic ducts during a fire, particularly when the ducts are being used in the exhaust mode. Air velocities in exhaust systems can be high, generally on the order of 1200 to 2500 ft. per minute, with the direction of flow from the interior of the building to the outside.

In the last three decades, fiberglass reinforced plastic ducts have become the preferred material for corrosive vapor exhaust systems. However, for fiberglass reinforced plastic ducts, their flammability is dependent upon which resins are used in conjunction with the fiberglass.

For example, many fires in the semiconductor industry start in pieces of equipment to which the duct is connected. In other industries, such as paper and pulp, fires often start at a point along a duct run, often caused by welding slag falling onto a duct and burning. If the combustible plastic duct material ignites, it can burn progressively along the length of the duct system spreading the fire throughout the building. Since some duct systems are hundreds of feet and others thousands of feet in length, the damage can be of large magnitude. Consequently, exhaust duct fires have resulted in many tens of millions of dollars in losses in a decade in the United States.

With the exception of a few phenolic resins, most resins used for fiberglass reinforced ducts burn fairly readily. Thus, it is conventional to place internal fire protection sprinklers inside fiberglass reinforced plastic ducts to prevent the spread of fire. On some occasions, special dampening devices may be used to block off the duct to prevent air flow and thereby stop the spread of fire.

It is not considered desirable to close off a fume exhaust duct in event of fire, for example by a fire damper. It is preferred for safety reasons to evacuate the smoke generated in a fire. Also, internal fire sprinklers, which are sometimes specified to prevent the spread of fire, are not considered desired since tests have demonstrated that in small ducts of 10" or 12" diameter, the flow of water from the sprinkler shuts off the air flow within the duct. As a consequence, the fire and smoke back up in the system and into the building, instead of being exhausted. Thus, it is desirable not to use dampening devices or sprinklers in exhaust ducts. In some installations such as paper and pulp mills, much of the ductwork is actually run out of doors on the outside of the building. If a fire protection sprinkler system is used, the sprinkler water pipes must parallel the duct system. In very cold climates, this creates serious problems, since the water may freeze in the pipes. In order to prevent this, expensive heat tracer lines must be used and the pipes must be insulated. This is an expensive nuisance, both for initial capital cost and maintenance cost. Dry pipe systems may be used, however flame detectors must be used to activate water valves admitting sprinkler water to the dry pipes. Such detectors are expensive and must be installed in each run of ducting. There is a time delay for water flow and when it occurs, possible damage may occur to plant, equipment and personnel because of collapsed ductwork unable to contain the weight of the water.

There are many situations where it is desirable to use fiberglass reinforced plastic ducts having resin systems other than phenolic based systems; resins which have good chemical resistance to particular environments, but because of their flammability characteristics would ordinarily require dampening devices or sprinklers.

In my U.S. Pat. No. 5,449,320, the deficiencies relevant to these fiberglass reinforced plastic duct exhaust systems have been overcome by the novel use of a collapsible connecting collar. The collapsible collar is made of a thermoplastic material which will melt at relatively low temperature drop out and open up the duct system to ambient air when it is exposed to fire or high temperature. By combining two different plastic materials, non-melting fiberglass reinforced plastics and a low melt temperature thermoplastic connecting collar, fire flow through the exhaust is interrupted, saving the system from destruction. An opening created in the duct system downstream of the fire will expose the connected ductwork to ambient air entrainment which will result in dramatic temperature dilution in the downstream ductwork. The lower air temperature maintains the interior surface of the downstream fiberglass reinforced plastic duct below its autoignition temperature which prevents the spread of fire through the duct system.

There are some potential problems with the aforesaid collapsible collar system however. One is that duct sections can come apart and collapse, possibly causing injury to those below the duct system; or if a piece of duct connected to the equipment falls down, and is on fire, it can spread fire in areas below the duct system. It is more desirable to have an exhaust duct system that does not collapse or come apart. A second problem is that should the duct system collapse or come apart, it will be less effective, or possibly not effective at all, in removing smoke from the piece of equipment or duct that is on fire. It is more desirable, therefore, to attempt to maintain some degree of suction pressure on the fire area to help remove some of the smoke and heat being generated by the fire.

SUMMARY OF THE INVENTION

It is the object of the present invention to provide fiberglass reinforced plastic duct exhaust systems which are appropriate for use without dampening devices or fire protection sprinkler systems.

It is a further object of the invention to use fiberglass reinforced plastic ducts having resin systems which meet the required industry test standards for use of plastic ductwork exhaust systems without dampening devices or sprinklers.

It is another object of the invention to use fiberglass reinforced plastic duct exhaust systems which meet the requirements of the Factory Mutual Research Corporation #4922 Duct Test Standard.

It is another object of the invention to use fiberglass duct exhaust systems which do not collapse or come apart.

It is another object of the invention to use fiberglass duct exhaust systems which maintain suction pressure on the fire area to remove smoke and heat being generated by the fire.

Briefly stated, in accordance with the present invention, the above objects can be obtained by the use of many fiberglass reinforced plastics in fume exhaust systems which were not previously acceptable. These fiberglass reinforced plastic use resin systems which, although being fire retardant, cannot pass the industry test standards for use in exhaust systems without dampening devices or sprinkler systems being installed therein to prevent the spread of fire throughout the duct system.

The deficiencies of the prior art resins relevant to their use in fiberglass reinforced plastic duct exhaust systems, as well as the potential problems associated with the aforesaid collar system of my U.S. Pat. No. 5,449,320 have been overcome by the novel use of low melt thermoplastic sections embedded in the fiberglass reinforced plastic ducts. These thermoplastic sections include various configurations of tee taps, dropout plates, shafts, round and rectangular relief ports. Under the influence of fire, direct flame impingement, or high heat, the thermoplastics melt and open up the fiberglass reinforced plastic duct system downstream of the fire. When that occurs, the opened thermoplastic area admits ambient air from its surroundings not involved in the fire providing temperature relief therein and downstream thereto due to the cooler air dilution. This also causes a suction pressure reduction at the point where the duct is in contact with the fire since not quite so much heat of flame would be drawn in at that point because of the openings developed in the duct.

BRIEF DESCRIPTION OF THE DRAWINGS

Although such novel features believed to be characteristic of the invention are listed in the claims, the invention in the manner in which it may be carded out may be further understood by reference to the following disclosure and to the accompanying drawings.

FIG. 3 is a segment view showing the flame being sucked into a duct going from point A to point C downstream.

FIG. 4A is a segment view a 90° tee tap at point B between points A and C.

FIG. 4B is a segment view showing branch tap at point B on a 90° elbow between points A and C.

FIG. 5 is a segment view showing the tee tap at point B being a damper having a shaft and a blade.

FIG. 6 is a segment view showing another embodiment as in FIG. 5.

FIG. 7 is a segment view showing a straight piece of fiberglass reinforced plastic duct with thermoplastic plugged circular ports at point B between A and C.

FIG. 8 is a segment view showing a straight piece of fiberglass reinforced plastic duct with thermoplastic plugged rectangular ports at point B between points A and C.

DESCRIPTION OF THE PREFERRED EMBODIMENT

Description of Duct Temperature Reducing Devices

In each of FIGS. 3 through 8, the duct and/or tees could be made of fiberglass reinforced plastic, or even the tee tap itself could be made of thermoplastics. In FIGS. 4, 5 and 6, there would be a dropout plate or shaft and blade made of low-melt temperature thermoplastics installed in the higher temperature resistant non-melting fiberglass reinforced plastic ductwork.

In FIGS. 7 and 8, various configurations of relief ports can be used, round and rectangular being shown, where the ports or pieces would be holes made into the fiberglass reinforced plastic duct of various configurations, which would then have bonded to them either circular, rectangular, oval, triangular or square ports of low melt temperature thermoplastics.

In all of these arrangements, FIGS. 4 through 9, the concept is somewhat similar to that expressed in my U.S. Pat. No. 5,449,320 in that low melt temperature thermoplastics would be combined with fiberglass reinforced plastic ductwork. Under the influence of fire, direct time impingement, or high heat, the thermoplastics in the present invention would melt and open up the fiberglass reinforced plastic duct system apertures. When that occurred, the apertures present at B would admit ambient air from a surrounding area not involved in the fire providing temperature relief to the ductwork entry at B and downstream at C. There would be two effects which would occur simultaneously. The first would be temperature reduction of downstream ductwork by virtue of the cooler air dilution that would come through area "B". In addition, there would be suction pressure reduction at A where the hear of flame enters the system because of the location of the alternate apertures areas at B. Not quite so much heat or flame would be drawn in at A because of the apertures that develop at B. This would also provide additional temperature relief at C. Fortuitous synergy would be at work.

In all of the Figures the cross sectional area of B is equal to the cross sectional area of A wherein A is where the heat or flame enters the system, C is the downstream dust area and B is the location of the thermoplastic covered apertures between A and C.

BACKGROUND: FIRE TEST STANDARDS

In order to determine which ducts are appropriate for use with sprinklers or dampening devices, a common test relied on in industry is the Factory Mutual Research Corporation #4922 Duct Test Standard.

Figure 1A:
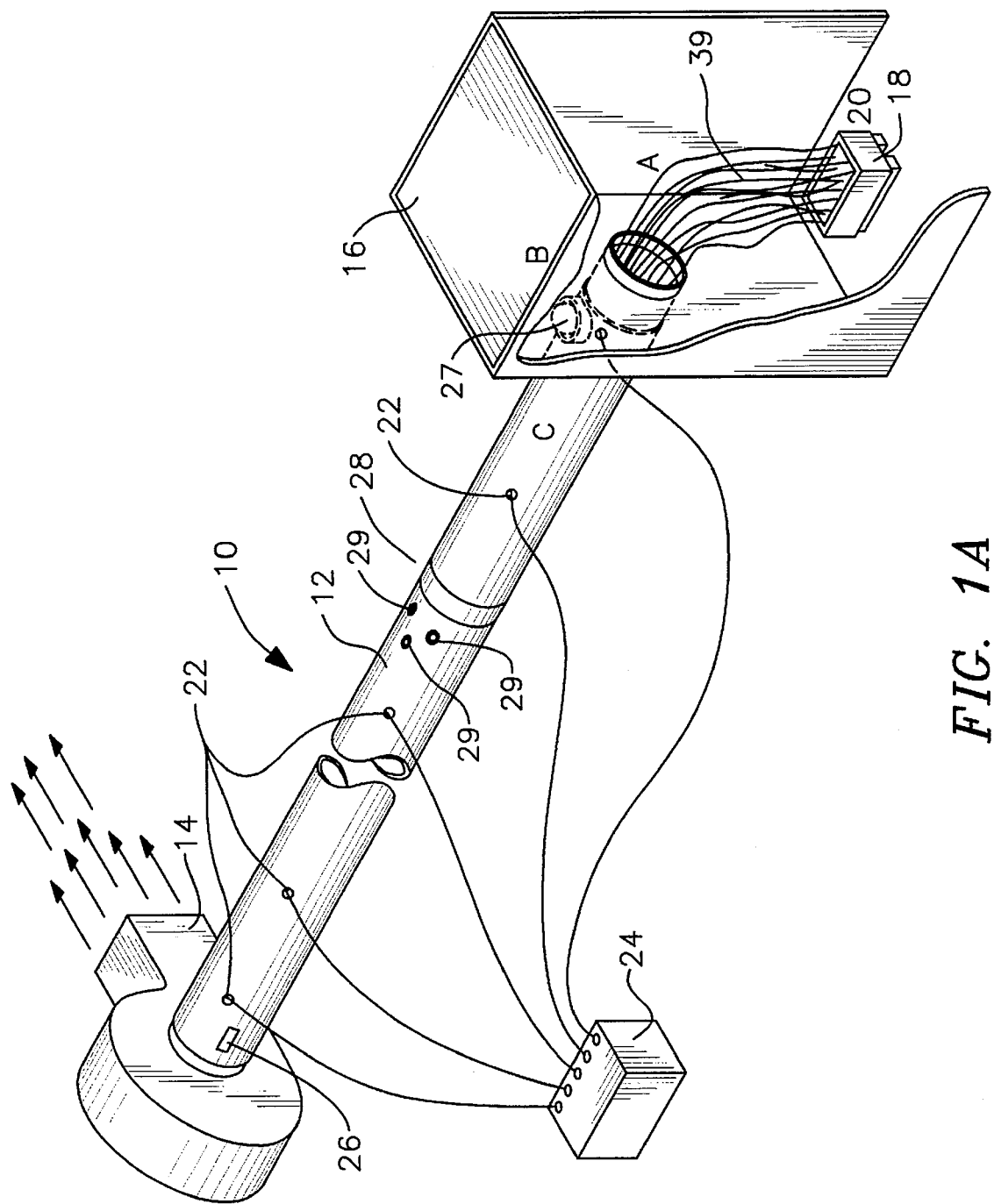
FIG. 1A is a perspective views of Factory Mutual Research Corporation's #4922 horizontal duct test apparatus to determine which ducts may be used without sprinklers or dampening devices having a tee shown.
Figure 1B:
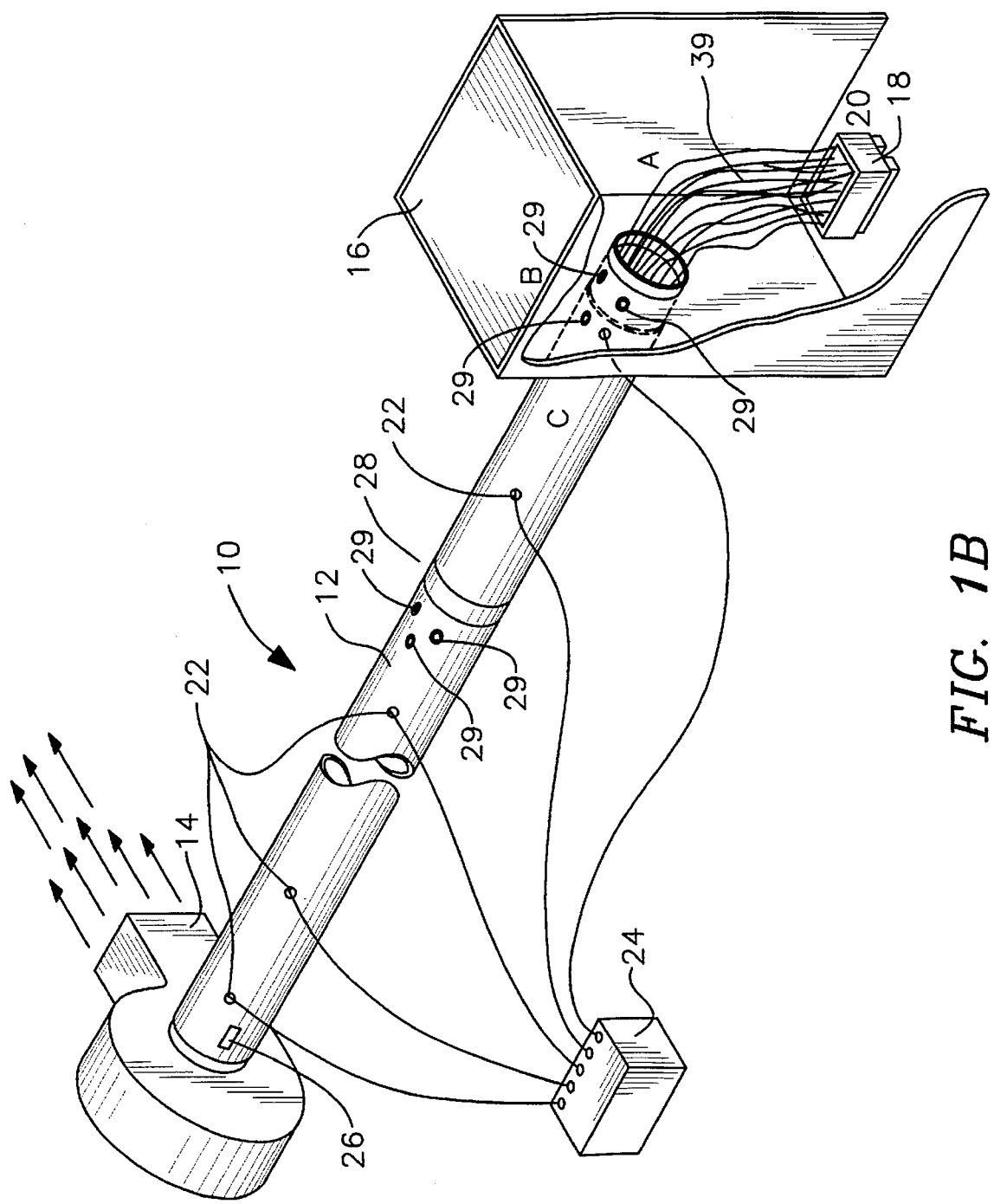
FIG. 1B is a perspective view of Factory Mutual Research Corporation's #4922 horizontal duct test apparatus to determine which ducts may be used without sprinklers or dampening devices having groups of apertures shown.

FIGS. 1A and 1B show the Factory Mutual test apparatus 10 for testing a horizontal duct. In this test one end of 24 feet of 12 inches diameter duct 12 is connected to an exhaust blower 14 and the opposite end projects into a draft shield booth 16 containing a pan 18 which holds 2.5 gallons of heptane 20. The heptane is ignited and the duct 12 is exposed to a fire 39 generated by the heptane at a rate of about 10,000

Btu's per minute. The test standard states the duct 12 should not burn from one end to the other in a period of 15 minutes in order to pass the test. Thermocouples 22 are located along the duct and are connected to temperature recorder 24. The temperature in the thermocouple closest to the exhaust blower 14 should not exceed 1,000° F. In addition, time may not be observed at sight hole 26 nearest the exhaust blower. Failure of any of these conditions causes rejection of the particular ductwork tested. If the ductwork meets all the criteria, it passes the test standard, and the duct is considered sufficiently safe to be used without internal sprinklers. A duct joint 28 is shown in the duct 12. A temperature reduction tee port 27 covered with a thermoplastic covering in FIG. 1A is similar to that shown in FIG. 4 as 27a. Temperature relief ports 29 covered with thermoplastic coveting in FIG. 1B are similar to those in FIG. 7 as thermoplastic plugged circular ports 29a.

It is thought that if a duct will not burn 24 feet in length in 15 minutes, it probably won't burn 100 feet in an hour. In that period of time, a large company fire brigade or a municipal fire department can respond to control the spread of fire by conventional fire fighting means. Thus, the Factory Mutual test is oriented to control the degree of fire damage that may be caused by the spread of fire through a non-metallic exhaust duct system.

Figure 2:
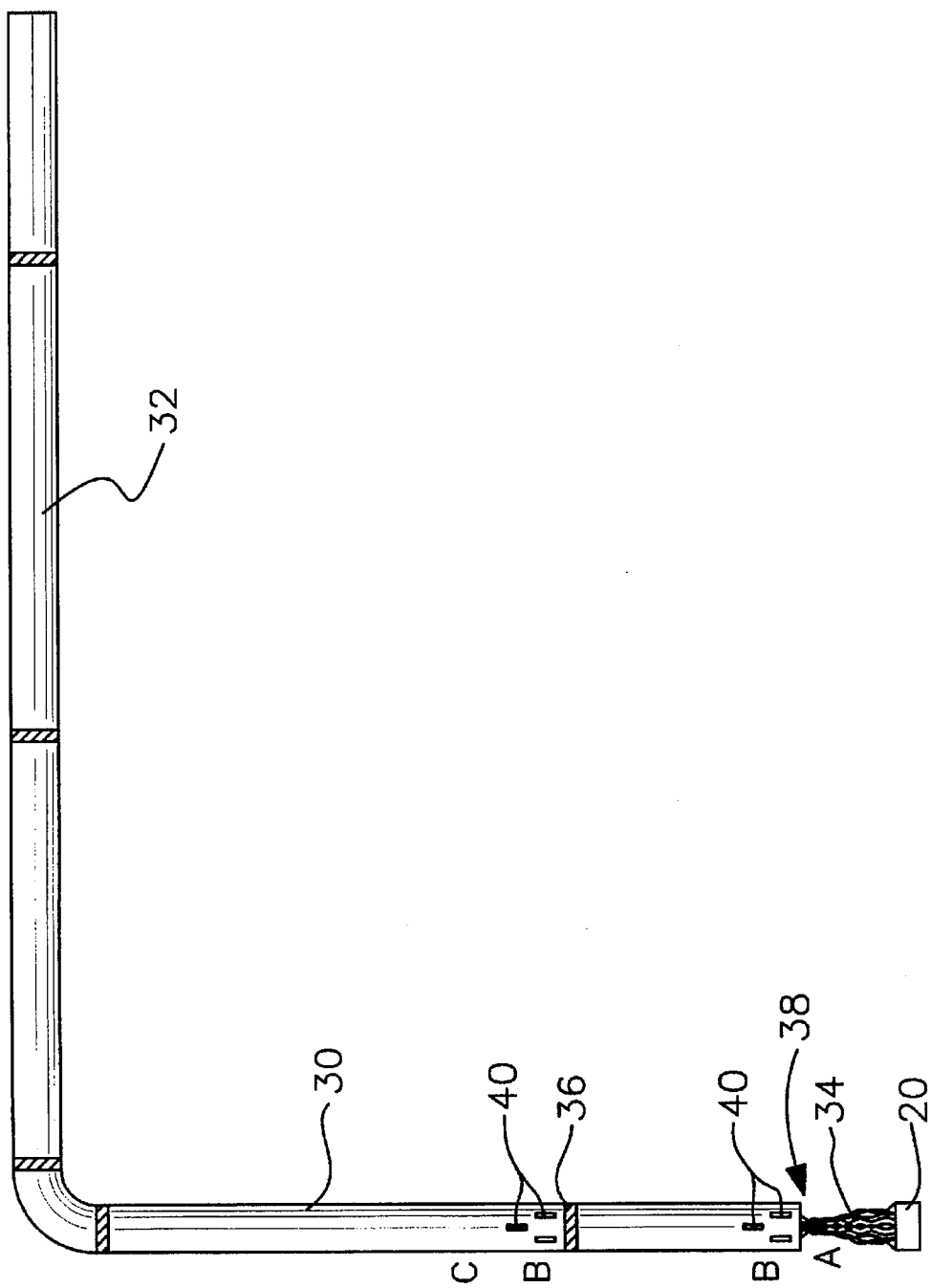
FIG. 2 is a perspective view of Factory Mutual Research Corporation's #4922 combination vertical/horizontal duct test.

FIG. 2 shows an additional fire test conducted by Factory Mutual Research Corporation's #4922 fume duct fire test. This consists of a combination vertical/horizontal connected ductwork. As shown 15 feet of 12 inch diameter duct 30 is installed in a vertical position and is connected to 24 feet of the same diameter duct horizontal 32 is a horizontal position. As in FIGS. 1A and 1B, a pan holding 2.5 gallons of heptane 20 causing a fire 34 is used as the fuel, and the test is run for 15 minutes. The duct performance must meet the same requirements as the duct shown in FIGS. 1A and 1B, and test requirements specify that the first duct joint 36 shall be within 5 feet of the duct entrance 38. Rectangular temperature reduction devices 40 are similar to the plugged rectangular ports shown in FIG. 8 as thermoplastic plugged rectangular ports.

FIG. 3 is a segment view indication how the fire 39 is sucked into the duct at its entrance A by suction pressure and is drawn in the direction of the air flow downstream towards C.

FIG. 4A is a segment view of a 90 degree tee tap 27a covered with a thermoplastic plate as indicated at B.

The FIG. 4B segment view is to a branch tap 42 covered with a thermoplastic plate as indicated at B.

Shown in FIG. 5 is a segment view of a tee tap damper 44 having a shaft 47 and blade 48 which could be operated manually if so desired. But would normally be operated automatically in response to sensors either the shaft or blade or both are made of meltable thermoplastic.

As seen in the FIG. 6 segment view is the same type of a device as in FIG. 5 with a motor drive 50 attached to the damper blade operated by a temperature sensing device 52. Either the tee or damper or both are made of meltable thermoplastics, fiberglass or metal. The temperature sensing device 52 can be either internal or external to the duct or can be an ultraviolet or infrared flame sensing devices or a combination infrared/ultraviolet detector.

Shown in FIG. 7 is a segment view of a straight piece of fiberglass reinforced plastic duct with metlable thermoplastic plugged circular ports 29a and B between A and C.

The segment view in FIG. 8 shows a straight piece of fiberglass reinforced plastic duct with meltable thermoplastic plugged rectangular ports 40a at B and between A and C.

The fiberglass reinforced plastics ducts in accordance with the present invention use what the fiberglass and resin industry call "fire-retardant" resins but ducts using them do not pass these Factory Mutual tests, because their fire resistance in and of themselves are insufficient to prevent the spread of fire throughout the duct as required. The present Invention eliminates the necessity of using sprinklers or dampers in these ducts by the novel use of collapsible ports shown in FIGS. 7 and 8 or other devices which dilute air temperature within the downstream duct. The various devices employ thermoplastic materials which can be either rigid or elastomeric as desired. Preferably, the materials used in the collapsible port devices have a relatively low melting point of about 220° to 650° F. Materials found to be satisfactory are polyethylene, polyolefins, polyvinychloride and similar thermoplastics, some of whose melting points are shown below. However, there are other materials which can be suitable as long as they comply with the teachings of this invention, whether or not they fall within the specific melting points stated herein.

TABLE I

TYPICAL MELTING POINTS OF THERMOPLASTICS IN DEGREES FAHRENHEIT

| | |
|---|---|
| Polyvinyl Chloride (PVC) | 302 |
| Polypropylene (PP) | 334 |
| Polyvinylidene Fluoride (PVDF) | 340 |
| Chlorinated Polyvinyl Chloride (CPVC) | 400–450 |
| Polychlorotrifluoroethylene (PCTFE) | 425 |
| Polyethylene (PE) | 450 |
| Ethylene-chlorotrifluoroethylene (ECTFE) | 464 |
| Polytetrafluoroethylene (PTFE) | 620 |

The thermoplastic materials used in the temperature reduction devices (TRDs) need not be all similar materials in the same device or location. Differing materials with different melt temperatures may be used in combination with each other in such a manner that on exposure to fire and elevating temperatures, those with lower melt temperatures will fail first, and as temperatures escalate, successive thermoplastics will melt or "fail" open at each higher temperature level. Such an arrangement can help to achieve the smoke removal efficacy of the duct system.

FURTHER EXPLANATION OF THE MECHANISM

The fire retardant resins used In the fiberglass plastic ducts of the invention do not have low melting points and have relatively high autoignition temperatures. The result is that when exposed to fire, these fiberglass reinforced ducts do not quickly ignite, degrade or collapse. However, in the event their surface temperature reaches their autoignition temperature, generally on the order of 800° to 1100° F., they will start on fire. As opposed to that condition, when the thermoplastic materials are exposed to fire or high heat, they will melt before the fiberglass will ignite and start to burn.

Figure 9:
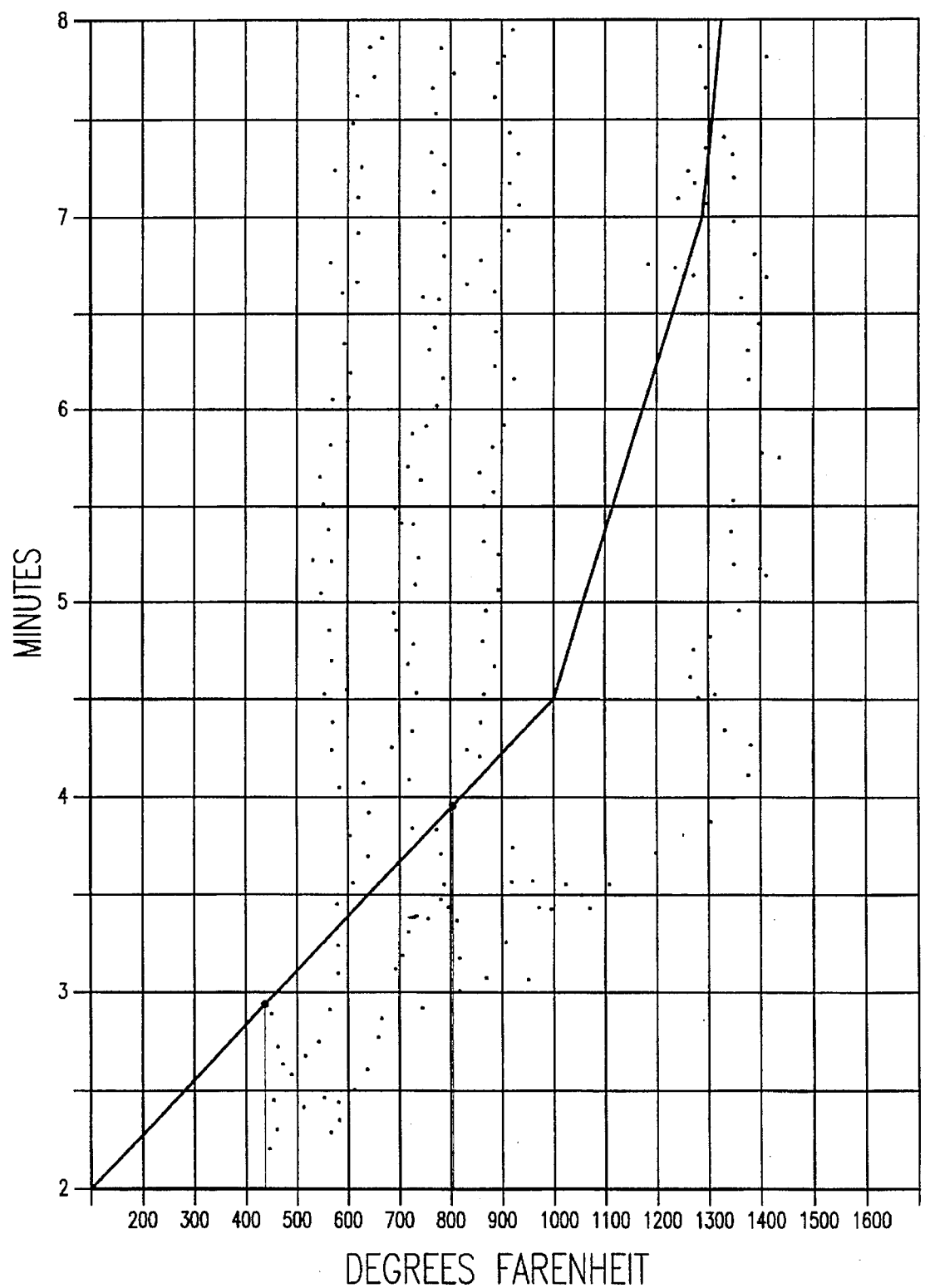
FIG. 9 represents the recording of temperatures of a typical horizontal duct fire test.

FIG. 9 is a recording of temperatures of a typical Factory Mutual #4922 horizontal duct fire test. This figure represents typical fire temperature rises; fires which generally start small and build up in temperature as time goes by. The vertical ordinate is in minutes; the horizontal ordinate shows the temperature increase achieved over a period of time. For example, after ignition of the heptane in the first minute or two, the temperature in the duct at point A the first thermocouple #22 in FIGS. 1A and 1B is very low. It takes approximately two and a half minutes to generate a temperature of 300° F. six inches in from the entrance to the duct section, three minutes for the temperature to get to 450° F.; almost three and a half minutes for it to get to 600° F., four minutes to arrive at 800° F., and four and a half minutes for the temperature at the duct inlet to get to be 1,000° F. This is typical of the common fire occurring within a piece of equipment enclosed with some sort of cabinet or tank to which the duct is connected. The temperature rise in the Factory Mutual test is more rapid than the well-known ASTM time-temperature curve which occurs in most fires. All locations of B in FIGS. 4 through 8 would be located outside the draft shield booth 16 shown in FIGS. 1A and 1B, simulation equipment and thus exposed to ambient air temperature only, assumed to be standard air at 70° F. In FIG. 2, points B would be either at a location above 37 or at 36, or both.

TEMPERATURE REDUCTION MECHANISM

Temperature reduction or increase is a natural phenomenon which comes about when two air streams of different temperatures meet and are mixed. In this case the air temperature inside the duct downstream of the fire at point A above the heptane fuel is being raised; however it is also being lowered once the thermoplastic devices at point B melt and opens the duct to dilution air. The temperature of the mixed air stream at point C can be calculated based on total heat in a straightforward manner. Each air stream has weight and heat.

EXAMPLES

TEMPERATURE OF MIXING BASED ON TOTAL HEAT

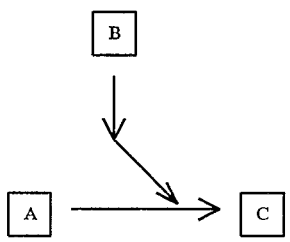

The heat required to raise a mass of air from one temperature to another is:

$$Q = MC(t_1 - t_2) \quad (EQ1)$$

Where:

Q=Total Heat in BTU.

M=Weight of the air mass in Lbs.

C=Heat capacity or specific heat in BTU/Lb °F.

$t_1$=Initial temperature, °F.

$t_2$=Final temperature, °F.

The value of "C" is approximately 0.24/BTU/lb. for air at atmospheric pressure and varies only 3% between 300° F. and 1000° F. Therefore this value can be considered a constant for these calculations. If we choose 0° F. as a baseline, then $t_1-t_2$ becomes just the measured value of the air temperature in °F. By the "FIRST LAW OF THERMODYNAMICS":

$$Q_C = Q_A + Q_B \quad (EQ2)$$

$$M_C \, C(t_C) = [(M_A)(C)(t_A)] + [(M_B)(C)(t_B)]$$

-continued $$t_C = [(M_A)(C)(t_A) + (M_B)(C)(t_B)] \div M_C C$$

$$t_C = [(M_A)(t_A) + (M_B)(t_B)] \div M_C \quad (EQ3)$$

The air pressure at the inlets of A & B is the same at each opening. Given the low inlet air velocities expected (less than 600 FPM in the FM standard), the pressure drop across the inlet air openings should be negligible. Since the force pushing the air into the inlets is the available air pressure multiplied by the available area, it follows that the mass pushed through each opening will be proportional to the area of the opening. The volume of air moving through each branch will vary as the temperature, and thus density changes; but because the fan is a constant mass device, the total weight of air moved will not change. The values of $M_A$ & $M_B$ can be expressed as percentages of $M_C$ proportional to relative areas of the inlets for the various conditions to be considered. Assume that point A is a 12 inch diameter duct normally used by Factory Mutual in its duct test; a 12 inch duct is 0.7854 square feet in area.

Also assume that point B may be some proportion in area compared to A and in the illustration shown below varies from 25% to 100%, i.e. the latter is equal in area to A. One would have the following conditions:

TABLE II

| Condition | Area of A, Sq. Ft. | Area of B as % A | Area B, Sq. Ft. | Total Sq. FT. A + B |
|---|---|---|---|---|
| 1 | 0.7854 | 0 | 0.0000 | 0.7854 |
| 2 | 0.7854 | 25 | 0.1960 | 0.9814 |
| 3 | 0.7854 | 50 | 0.3930 | 1.1784 |
| 4 | 0.7854 | 75 | 0.5890 | 1.3744 |
| 5 | 0.7854 | 100 | 0.7854 | 1.5708 |

Calculating the relative proportions which each inlet A and B would be able to contribute to the mixed air temperature we have based on each of the above conditions:

TABLE III $A_1 = 1.0$  $B_1 = 0$
$A_2 = .80$  $B_2 = .20$
$A_3 = .661$  $B_3 = .3334$
$A_4 = .57$  $B_4 = .43$
$A_5 = .50$  $B_5 = .50$
Here A + B = 100%.

and so for each condition:

| Condition | $M_A$ | $M_B$ |
|---|---|---|
| 1 | $M_C$ | 0 |
| 2 | .80 $M_C$ | .20 $M_C$ |
| 3 | .667 $M_C$ | .3334 $M_C$ |
| 4 | .57 $M_C$ | .43 $M_C$ |
| 5 | .50 $M_C$ | .50 $M_C$ |

Substituting these values into equation No. 3 and using 75° F. for $t_B$ for each condition yields:

$t_{C1} = t_A$
$t_{C2} = 0.80 \, t_A + 15°$ F.
$t_{C3} = 0.667 \, t_A + 25°$ F.
$t_{C4} = 0.57 \, t_A + 32.25°$ F.
$t_{C5} = 0.50 \, t_A + 37.50°$ F.

For $t_A=300°$ F., 600° F., 1000° F.:

TABLE IV

| $t_A$ | 300° F. | 600° F. | 1000° F. |
| --- | --- | --- | --- |
| $t_{C1}$ | 300° F. | 600° F. | 1000° F. |
| $t_{C2}$ | 255° F. | 495° F. | 815° F. |
| $t_{C3}$ | 225° F. | 425° F. | 691° F. |
| $t_{C4}$ | 203° F. | 374° F. | 602° F. |
| $t_{C5}$ | 188° F. | 338° F. | 538° F. |

It can be seen that using PVC only 25% of the area of A need be used at B to cause the "failure" at the B opening when the temperature at A becomes 300° F., approximately two minutes into the fire test. Progressively one could continue to use PVC, or switch to PVDF or polypropylene but still use only 25% of the area of A to maintain a low temperature at C. If one were trying to preserve a smoke removal rating on the duct one could select a material with higher melt temperatures, such as CPVC, PCTFE or ECTFE, and again, only 25% of the area of A need be used. It would only be 3 minutes into the test to reach their melting points based on the temperature at A. If however, 25% of the area had used PVC, and an additional 25% of the area used PCTFE, 50% of the duct area A would now be open at B, and the temperature downstream at C would only be 425° F.

One could use a PTFE plug with 50% open area at B and still keep duct temperatures low. Eventually if the fire has not been detected and extinguished, the temperature of the fire gets to 1400° F. at point A, but with only a 75% opening at B, the downstream duct temperature at C is only 830° F., or one could use a 90 degree tee or plugs that would provide equivalent area at B as there is at A. Then the mixed air stream will only rise to 738° F., ($[0.50 \times 1400]+[0.50 \times 75]$), hardly enough to ignite any fire retardant fiberglass reinforced plastic duct. If one wished to be real conservative one could use a 180° cross fitting at B to provide twice the dilution area at B as compared to area A. When the fire temperature at point A reaches 1400° F. the mixed air temperature would be 1400+3+2(37.5)=542° F. If the temperature at point A got to 2000° F. the mixed air temperature at C would be 742° F.

One obvious advantage of the temperature reducing devices is being able to use ductwork with high corrosion resistance without the necessity of internal fire protection sprinklers. A second less obvious one is to preserve the ability of the duct to function as a smoke removal duct. In many fume exhaust duct applications, there is no issue as it relates to smoke removal, but in certain industries, the ability to achieve immediate smoke removal is paramount. For example, in the semiconductor industry, the concept of "dirt" almost borders on paranoia. A small smoke particle (around 10 microns) is a huge boulder that can demolish the value of an individual chip or wafer. If one cannot structure a system to prevent the invasion of smoke particles into product or a building's air conditioning system, one can destroy the ability of a one billion dollar facility from being productive. Thus, extensive monetary savings can be provided by eliminating the cost of a fire protection system of sprinklers and/or dampers in a fume exhaust system.

In the Factory Mutual Duct smoke removal test, the fire test portion is conducted first at velocities of 600 foot per minute during the 15 minute duration of the heptane fire. At the end of that time, the fire source is shut down by placing a cover over the pan of heptane so it is unable to burn. The fan speed is then increased to provide a duct velocity of 2,000 feet per minute. The duct may not breach or collapse at that velocity. This demonstrates the ability of the duct to function to exhaust smoke from a fire.

One may calculate the minimum percent open area required at point B in FIGS. 4 through 8 to prevent ignition of the ductwork downstream. This minimum quantity of air at B will ensure that not all suction pressure is lost at point A so a portion of the heat and smoke being generated by the fire at A is relieved through the downstream duct system itself. Thus, even when the fire may be active at the exhaust duct entrance, a certain amount of the smoke being generated by the fire in the equipment and across the fire, smoke will not migrate to the exterior of the equipment. In addition, since the fire does not progress in the downstream duct, the structural integrity of the duct will not be impaired, and it can pass the Factory Mutual test for smoke removal.

There are other areas where the TRD's i.e. temperature reduction devices may be used to advantage; for example, in scrubber ductwork, at or near fans, and even on supply air systems. Wherever there can be advantage of combining low melt temperature thermoplastic materials with non-melting fiberglass, and where the relief is to be gained in temperature reduction between the two when a duct fire occurs.

These devices can even be used to advantage on those duct systems using phenolic or other resins which might ordinarily pass most if not all the Factory Mutual IE. FM tests. For example, one of the FM tests is the combination vertical/horizontal test. The vertical leg is normally 15 feet high, however many installations in the field often have duct heights of 30 to 40 feet. Many ducts which pass the 15 foot height test fail the test when higher heights are used. TRDs may be placed at the first and/or subsequent joints in the vertical leg as seen in FIG. 2 to provide dilution air and cooling to enable the duct to pass the test. In a like manner, the same principal may be used to advantage with stacks. Though stacks don't have a fan in them, the suction pressure inside the vertical stack can be much higher than might normally occur when a fan is used. A fan tends to function as a restricting orifice, limiting the amount of suction pressure in a vertical or horizontal duct. A stack, being open and free, is not limited and can generate much higher velocities than would otherwise occur. The use of TRDs can help to break the additional vacuum, reducing suction pressure, entrain dilution air, and reduce the stack temperature.

The temperature reduction devices are themselves relatively inexpensive. They are however, an integral part of and inseparable from the ductwork itself. Of course, each piece of equipment connected to the duct would have to have its own device; in addition it may be necessary or desirable to install additional, redundant devices along duct lengths periodically on a long duct system to limit any potential damage should any of the devices fail to do its job for any reason. A competent engineer can easily do the calculations necessary to determine the sizing and location of these devices. Some redundancy would be a small insurance premium to pay for system security.

Those skilled in the art of plastic materials, resins and solvents, having reviewed the above disclosure, can readily make a great variety of combinations of materials to provide effective fire protection for fiber glass reinforced duct systems without departing from the spirit and scope of my invention.

What is claimed is:

1. A fire retardant duct system for conducting exhaust vapors and fumes from a building comprising, said duct system having a fiberglass reinforced noncollapsible plastic duct and having a front opening, a downstream portion and at least one aperture in the duct wall there between, said aperture covered by meltable components mounted thereon, the fiberglass reinforced plastic comprising fire retardant resins having a relatively high autoignition temperature, said meltable components comprising thermoplastic resins having melting points lower than said autoignition temperature of the reinforced plastic fire retardant resins, whereby said meltable components melt and lay open at least part of said wall aperture when exposed to high temperatures without the plastic duct collapsing.

2. A fire retardant duct system according to claim 1 wherein said wall aperture is circular, rectangular, oval, triangular or square.

3. A fire retardant duct system according to claim 2 wherein a tee tap covered by the meltable component is mounted on said wall aperture.

4. A fire retardant duct system according to claim 2 wherein a plurality of wall apertures have meltable components mounted thereon.

5. A fire retardant duct system according to claim 4 wherein at least two groups of wall apertures, spaced apart, have meltable components mounted thereon.

6. A fire retardant duct system according to claim 5 wherein said meltable components are prepared from different thermoplastic resins.

7. A fire retardant duct system according to claim 3 having branch top covered by the meltable component is mounted thereon.

8. A fire retardant duct system according to claim 3 wherein said meltable component is a damper having a shaft and blade.

9. A fire retardant duct system according to claim 8 wherein said damper is operated by a temperature sensing device.

10. A fire retardant duct system according to claim 4 wherein said wall apertures are circular port holes plugged with thermoplastic resin.

11. A fire retardant duct system according to claim 4 wherein said wall apertures are rectangular port holes plugged with thermoplastic resin.

12. A fire retardant duct system according to claim 1 wherein said wall aperture is about ten percent to two hundred percent of said front opening of the duct system.

13. A fire retardant duct system according to claim 3 wherein said tee tap is about ten percent to two hundred percent of said front opening of the duct system.

14. A fire retardant duct system according to claim 4 wherein the total of said plurality of apertures are about ten percent to two hundred percent of said front opening of the duct system.

15. A fire retardant duct system according to claim 11 wherein said thermoplastic resins are rigid or flexible elastomeric materials.

16. A fire retardant duct system according to claim 6 wherein said different thermoplastic resins have different melting temperatures.

17. A method of conducting exhaust vapors and fumes from a building by means of retardant duct system comprising preparing a fiberglass reinforced plastic duct having a relatively high autoignition temperature and having a noncollapsible duct wall with at least one wall aperture therein, covering said wall aperture with a thermoplastic resin having a melting point lower than said autoignition temperature, exposing said duct system to high temperatures which melt at least part of the thermoplastic resin and lays open at least part of said wall aperture to surrounding ambient air without the plastic duct collapsing.

* * * * *